United States Patent
Brooker et al.

(10) Patent No.: US 10,423,123 B2
(45) Date of Patent: *Sep. 24, 2019

(54) SYSTEM, APPARATUS AND METHOD FOR USING BIREFRINGENT LENSES TO CREATE HOLOGRAMS FROM RECEIVED ELECTROMAGNETIC RADIATION

(71) Applicant: CELLOPTIC, INC., Rockville, MD (US)

(72) Inventors: Gary Brooker, Rockville, MD (US); Nisan Siegel, Silver Spring, MD (US)

(73) Assignee: CellOptic, Inc., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/308,208

(22) PCT Filed: Apr. 30, 2015

(86) PCT No.: PCT/US2015/028477
§ 371 (c)(1),
(2) Date: Nov. 1, 2016

(87) PCT Pub. No.: WO2015/168384
PCT Pub. Date: Nov. 5, 2015

(65) Prior Publication Data
US 2017/0052508 A1 Feb. 23, 2017

Related U.S. Application Data

(60) Provisional application No. 61/987,205, filed on May 1, 2014.

(51) Int. Cl.
*G03H 1/04* (2006.01)
*G02B 1/08* (2006.01)
(Continued)

(52) U.S. Cl.
CPC .............. *G03H 1/041* (2013.01); *G02B 1/08* (2013.01); *G02B 5/3016* (2013.01);
(Continued)

(58) Field of Classification Search
CPC .. G02B 5/3083; G02B 27/283; G02B 5/3016; G02B 27/0172; G02B 1/08;
(Continued)

(56) References Cited

U.S. PATENT DOCUMENTS 3,856,986 A 12/1974 Macovski
4,905,169 A 2/1990 Buican et al.
(Continued)

FOREIGN PATENT DOCUMENTS

WO WO 2014/132781 A1 9/2014

OTHER PUBLICATIONS

Katz et al. ("Enhanced resolution and throughput of Fresnel incoherent correlation holography (FINCH) using dual diffractive lenses on a spatial light modulator (SLM)" Optics Express, Apr. 9, 2012, vol. 20, No. 8 pp. 9109-9121).*

(Continued)

*Primary Examiner* — Jade R Chwasz
(74) *Attorney, Agent, or Firm* — Nixon & Vanderhye, P.C.

(57) ABSTRACT

The inventors have discovered a method to improve image quality in holography and, for the first time, utilize lenses made from birefringent materials to advantageously split an incoming beam of either coherent or incoherent light into two coincident beams with different focal lengths that interfere with one another and thus create holograms free of electro-optical or pixelated devices. This discovery has many advantages over current methods to create holograms in which many components, including multiple lenses, other electro-optical devices, and/or beam paths are necessary to create holograms. The current invention provides a purely optical holographic process which has better performance and holographic simplicity, in addition to being able to (Continued)

miniaturize holographic processes more than is currently possible in state of the art holography systems.

20 Claims, 12 Drawing Sheets

(51) Int. Cl.
| | |
|---|---|
| *G02B 5/30* | (2006.01) |
| *G02B 27/28* | (2006.01) |
| *G03H 1/06* | (2006.01) |
| *G03H 1/00* | (2006.01) |
| *G03H 1/02* | (2006.01) |

(52) U.S. Cl.
CPC ......... *G02B 5/3083* (2013.01); *G02B 27/283* (2013.01); *G03H 1/0443* (2013.01); *G03H 1/06* (2013.01); *G03H 2001/005* (2013.01); *G03H 2001/0216* (2013.01); *G03H 2001/0447* (2013.01); *G03H 2001/0452* (2013.01); *G03H 2222/31* (2013.01); *G03H 2223/17* (2013.01); *G03H 2223/20* (2013.01)

(58) Field of Classification Search
CPC .. G02F 1/13363; G03H 1/0005; G03H 1/041; G03H 1/04; G03H 1/06; G03H 2001/005; G03H 2222/31; G03H 2223/17; G03H 2223/20; G03H 1/0443; G03H 1/0866
USPC .................................. 359/30, 10, 11, 15, 19
See application file for complete search history.

(56) References Cited

U.S. PATENT DOCUMENTS

| | | | | |
|---|---|---|---|---|
| 7,218,429 | B2* | 5/2007 | Batchko | G02B 3/14 349/200 |
| 2012/0050832 | A1* | 3/2012 | Rosen | G03H 1/0443 359/25 |
| 2013/0083386 | A1* | 4/2013 | Harding | G01N 21/21 359/240 |
| 2016/0011564 | A1 | 1/2016 | Tanabe et al. | |
| 2016/0357146 | A1* | 12/2016 | Brooker | G03H 1/041 |
| 2017/0185036 | A1* | 6/2017 | Brooker | G03H 1/041 |
| 2017/0242398 | A1* | 8/2017 | Brooker | G03H 1/041 |

OTHER PUBLICATIONS

Rosen et al. ("FINCH: Fresnel Incoherent Correlation Hologram", Holography, Research and Technologies, Prof. Joseph Rosen (Ed.), ISBN: 978-953-307-227-2, InTech, <<http://www.intechopen.com/books/holography/research-and-technologies/finch-fresnel-incoherent-correlation-hologram>> pp. 135-154).*

International Search Report for PCT/US2015/028477, dated Jan. 29, 2016, 4 pages.

Brooker et al., "In-line FINCH super resolution digital holographic fluorescence microscopy using a high efficiency transmission liquid crystal GRIN lens", Optic Letters, vol. 38, No. 24, Dec. 15, 2013, pp. 5264-5267.

JP Office Action dated Oct. 24, 2017 in related Application No. 2017-510440.

Lohmann, "Wavefront Reconstruction for Incoherent Objects", Journal of the Optical Society of America, vol. 55, No. 11, Nov. 1, 1965, p. 1555, XP55443774.

Katz et al., "Enhanced Resolution and Throughput of Fresnel Incoherent Correlation Holography (FINCH) Using Dual Diffractive Lenses on a Spatial Light Modulator (SLM", Optics Express, vol. 20, No. 8, Apr. 9, 2012, p. 9109.

Extended European Search Report dated Feb. 9, 2018, in corresponding Application No. 15786627.8.

* cited by examiner

SYSTEM, APPARATUS AND METHOD FOR USING BIREFRINGENT LENSES TO CREATE HOLOGRAMS FROM RECEIVED ELECTROMAGNETIC RADIATION

CROSS-REFERENCE TO RELATED APPLICATIONS

This application is the U.S. national phase of International Application No. PCT/US2015/028477, filed Apr. 30, 2015, which designated the U.S. and claims the benefit of priority to U.S. Provisional Application Ser. No. 61/987,205, filed May 1, 2014, the contents of each of which are hereby incorporated herein by reference.

GOVERNMENT RIGHTS

This invention was made with U.S. government support under grant R44CA192299 awarded by the National Cancer Institute (NCI). The U.S. government has certain rights in the invention.

BACKGROUND

1. Field

This invention relates to an apparatus for collecting Fresnel Incoherent Correlation Holography (FINCH) or other holography images by use of a birefringent lens or optical element to alter the phase properties of the received light or other electromagnetic radiation. The invention also relates to systems and methods for collecting these holography images.

2. Description of the Related Art

Holograms are records of the interference patterns created by two or more light or other radiation waves. In order for the waves to interfere they must have different phase properties. In current holography methods the waves that are to be interfered are passed through different optical paths that impart different phase properties on each wave. In one class of methods of single-path holography, the waves are commonly given different phase properties by being passed through or reflected off of digitized phase patterns displayed on a spatial light modulator (SLM) or other optical element. In another class of methods for self-interference holography, the waves originate from a single wave and are split by a beam splitter, then reflected off differing mirrors before being recombined in the last part of the beam path and brought to interfere. All of these methods produce holograms that may suffer from significant defects due to slight mismatches in optical path length, quantization errors or undesired diffraction effects of the SLM or other optical element. An apparatus, system or method that allowed all the waves to pass in the same optical path while receiving different phase properties, without being subject to unnecessary reflections or quantization errors or undesired diffraction effects, would be a material advance in the field of holography.

SUMMARY OF THE INVENTION

Accordingly, one object of the current invention is to provide an apparatus with non-quantized anisotropic electromagnetic properties used to create electromagnetic interference from received electromagnetic radiation, and a method for its use. The anisotropic electromagnetic properties may derive from one or more anisotropic components such as optically birefringent crystalline or liquid crystalline materials of any kind active at any wavelength, and may be further adjusted by combination with other materials. The received electromagnetic radiation may be from sources such as x-rays, black body radiation, or light of any wavelength from any source, coherent or incoherent. In the apparatus, the received electromagnetic radiation is then transformed by refraction into two or more differentially modulated waves propagating in a common path, and the modulated electromagnetic waves create the electromagnetic interference, which can take the form of a Fresnel, Fourier, Fresnel Incoherent Correlation Holography (FINCH), off-axis or other hologram. The interference is recorded by a recording device, and information about the source of the received radiation can be obtained from the interference.

Another object of the current invention is to provide an apparatus with non-quantized anisotropic electromagnetic properties used to create electromagnetic interference from received electromagnetic radiation, and a method for its use. The anisotropic electromagnetic properties may derive from one or more anisotropic components such as optically birefringent crystalline or liquid crystalline materials of any kind active at any wavelength, and may be further adjusted by combination with other materials. The received electromagnetic radiation may be from sources such as x-rays, black body radiation, or light of any wavelength from any source, coherent or incoherent. In the apparatus, the received electromagnetic radiation is then transformed by refraction into two or more differentially modulated waves propagating in a common path with programmed differences between the modulations. The modulated electromagnetic waves create the electromagnetic interference, which can take the form of a Fresnel, Fourier, Fresnel Incoherent Correlation Holography (FINCH), off-axis or other hologram. The interference is then used to deliver the programmed information to a subsequent device or object such as a microscope sample or optical recording medium.

Another object of this invention is to provide the advantages listed above in configurations that do not require external power sources, allowing interference waves (and holograms) to be obtained in a portable manner.

DETAILED DESCRIPTION OF THE DRAWINGS

Figure 1:
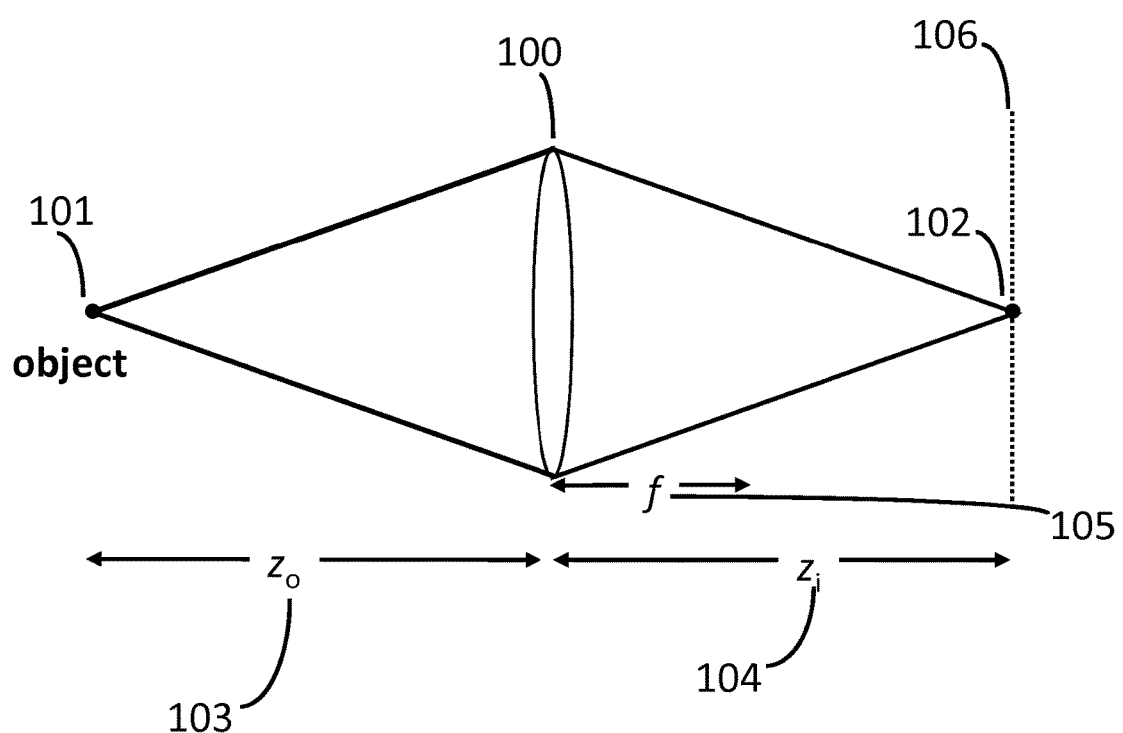
FIG. 1. A diagram depicting a conventional imaging lens wherein the received electromagnetic (EM) radiation from the object is focused to only one plane of focus.

In classical optical imaging, a beam of light is emitted or reflected from an object, and is then collected by a lens. In the simplest case, the light beam is focused by this lens to create an image at a focal plane. The image is two-dimensional as shown in FIG. 1 depicting a lens 100 with focal length 105 of f, creating at a focal plane 106 an image 102 of an object 101, and it is not possible to discern three-dimensional (3D) information about the object 101 above or below the plane of focus. Any information above or below the plane of the object is not translated to the plane of focus of the lens and is lost.

While other lenses can be added to the system to improve the image quality or change the magnification, the 3D information is still lost. Holographic methods enable the imaging of the 3D information in a scene. A number of holographic methods exist in which a sample is illuminated by a laser such that interference of light reflected or emitted from a sample in combination with a reference beam creates holograms which fully describe the 3D properties of an object [Nature 161, 777-778 (1948)]. In classical holography a coherent source is split into a sample and reference beam, which then interfere with one another to create a hologram. While this method cannot be used to measure incoherent light emissions, such as from a fluorescent sample, scanning holography has been proposed in which an interference pattern is scanned across a sample to excite fluorescence and then correlated with a sample beam to create a hologram [Opt. Lett. 22, 1506-1508 (1997)]. That method is quite complex, and as a multibeam process it suffers from stringent alignment requirements and is sensitive to environmental instability because of the need to prevent any vibration in the system.

Figure 2:
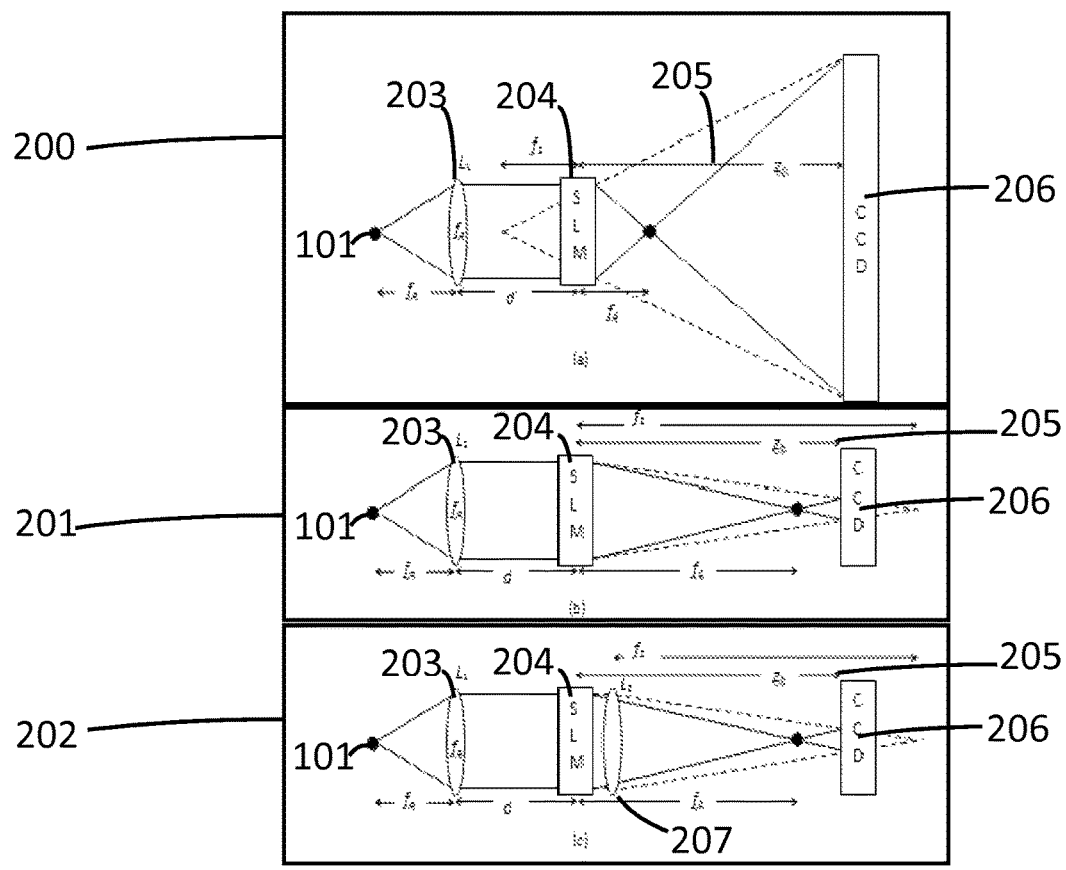
FIG. 2. A diagram depicting three configurations for Fresnel Incoherent Correlation Holography (FINCH) imaging using a spatial light modulator (SLM) to produce the reference and sample beams.

Another method for incoherent holography invented by one of the present inventors in 2006 [U.S. Pat. No. 8,542, 421; Opt. Lett. 32, 912-914 (2007)] is dubbed FINCH for Fresnel Incoherent Correlation Holography. FINCH creates holograms from an object emitting incoherent light in a single beam system by self-interference from two spherical waves originating from the object. Three example configurations of FINCH using a spatial light modulator (SLM) are shown in FIG. 2 [adapted from Opt. Exp. 19, 26249-26268 (2011)]. Described in FIG. 2 is 200 FINCH with two diffractive lenses displayed on the SLM 204, in which one ($f_d$) is positive and the other ($f_2$) is negative. The diffractive lenses focus the light received from the object 101 through an intermediate lens 203 into a hologram recorded by a CCD camera 206 at a distance 205 ($z_h$) away from the SLM. Described in 201 is FINCH with two diffractive lenses on the SLM 204, in which both lenses are positive ($f_d$ is the shorter focal length, $f_2$ the longer). The remainder of this type of FINCH is similar to that in 200. In 202 is a practical setup that emulates the setup of 201, with one positive diffractive lens ($f_d$) displayed on the SLM 204 and one positive glass lens 207 ($f_2$) placed near to the SLM. FIG. 2 was adapted from Opt. Exp. 19, 26249-26268 (2011). One skilled in the art will understand that in the previous paragraph and throughout this document, the SLMs or other elements that replace the SLMs are not limited to displaying only one or two lenses, and that they may display three or more lenses or other phase patterns as desired for advantageous application to the holographic process.

FINCH has shown potential for fluorescence microscopy (J. Rosen and G. Brooker, "Non-scanning motionless fluorescence three-dimensional holographic microscopy" Nat. Photonics 2, 190-195 (2008)), and much work has been done to perfect the technique into a useful high resolution 3D imaging method. The concept that a 3D image could be obtained from incoherent sources by a holographic process, without lasers, scanning or axial translation or the need to capture images at multiple planes of focus to create a 3D image is appealing. The field has now advanced as a result of additional work from our group (G. Brooker, N. Siegel, V. Wang, and J. Rosen, "Optimal resolution in Fresnel incoherent correlation holographic fluorescence microscopy," Opt. Express 19, 5047-5062 (2011); J. Rosen, N. Siegel, and G. Brooker, "Theoretical and experimental demonstration of resolution beyond the Rayleigh limit by FINCH fluorescence microscopic imaging," Opt. Express 19, 26249-26268 (2011); B. Katz, J. Rosen, R. Kelner, and G. Brooker, "Enhanced resolution and throughput of Fresnel incoherent correlation holography (FINCH) using dual diffractive lenses on a spatial light modulator (SLM)," Opt. Express 20, 9109-9121 (2012); N. Siegel, J. Rosen, and G. Brooker, "Reconstruction of objects above and below the objective focal plane with dimensional fidelity by FINCH fluorescence microscopy," Opt. Express 20, 19822-19835 (2012)) and other laboratories (P. Bouchal, J. Kapitan, R. Chmelik, and Z. Bouchal, "Point spread function and two-point resolution in Fresnel incoherent correlation holography," Opt. Express 19, 15603-15620 (2011); X. Lai, Y. Zhao, X. Lv, Z. Zhou, and S. Zeng, "Fluorescence holography with improved signal-to-noise ratio by near image plane recording," Opt. Lett. 37, 2445-2447 (2012); O. Bouchal and Z. Bouchal, "Wide-field common-path incoherent correlation microscopy with a perfect overlapping of interfering beams," J. Europ. Opt. Soc.—Rap. Pub. 8, 13011 (2013)) including the demonstration that the FINCH optical system is inherently super-resolving (J. Rosen, N. Siegel, and G. Brooker, "Theoretical and experimental demonstration of resolution beyond the Rayleigh limit by FINCH fluorescence microscopic imaging," Opt. Express 19, 26249-26268 (2011).; B. Katz, J. Rosen, R. Kelner, and G. Brooker, "Enhanced resolution and throughput of Fresnel incoherent correlation holography (FINCH) using dual diffractive lenses on a spatial light modulator (SLM)," Opt. Express 20, 9109-9121 (2012); N. Siegel, J. Rosen, and G. Brooker, "Reconstruction of objects above and below the objective focal plane with dimensional fidelity by FINCH fluorescence microscopy," Opt. Express 20, 19822-19835 (2012)) Recently it has been shown that the reason for this is that FINCH overcomes the Lagrange invariant (X. Lai, S. Zeng, X. Lv, J. Yuan, and L. Fu, "Violation of the Lagrange invariant in an optical imaging system," Opt. Lett. 38, 1896-1898 (2013) [10]). More recently FINCH holograms have been created using electrically modulated transmission liquid crystal optics (G. Brooker, N. Siegel, J. Rosen, N. Hashimoto, Makato Kurihara and A. Tanabe, "In-line FINCH super resolution digital holographic fluorescence microscopy using a high efficiency transmission liquid crystal GRIN lens," Opt. Lett. 38(24), 5264-5267 (2013). Additionally, the inclusion of a Nipkow disk has been used to create confocal FINCH images, (N. Siegel and G. Brooker, "Improved axial resolution of FINCH fluorescence microscopy when combined with spinning disk confocal microscopy," *Optics Express* Vol. 22, pp 22298-22307 (2014) and U.S. patent application 62/023,958). The FINCH holographic process is the subject of U.S. Pat. Nos. 8,009,340; 8,179,578; 8,405,890; 8,542,421 and Japanese patent 8,542,421.

While FINCH is a considerable advance in incoherent holography, the SLM method of creating the two interfering beams still requires two different lenses and those lenses require perfect alignment. The SLM method used involves displaying one or more different lens patterns on a spatial light modulator (SLM) [Opt. Lett. 32, 912 (2007); Opt. Exp. 19, 5047 (2011)] but is prone to low hologram quality due to lens sampling and to low efficiency due to higher-order diffracted images. These issues lead to poor interference, high background and low resolution due to the limited number of pixels and bit depth of the SLM. Furthermore, since SLM's are reflective, the optical arrangement requires that the SLM be positioned on an angle from the optical axis of the imaging system or arranged on a beam splitter to circumvent mounting it on an angle. However, angled incidence of the original light beam makes calibration of the SLM difficult for multiple focal lengths, and use of a beam splitter significantly reduces the light budget of the optical system [Opt. Exp. 19, 5047 (2011)].

Figure 3:
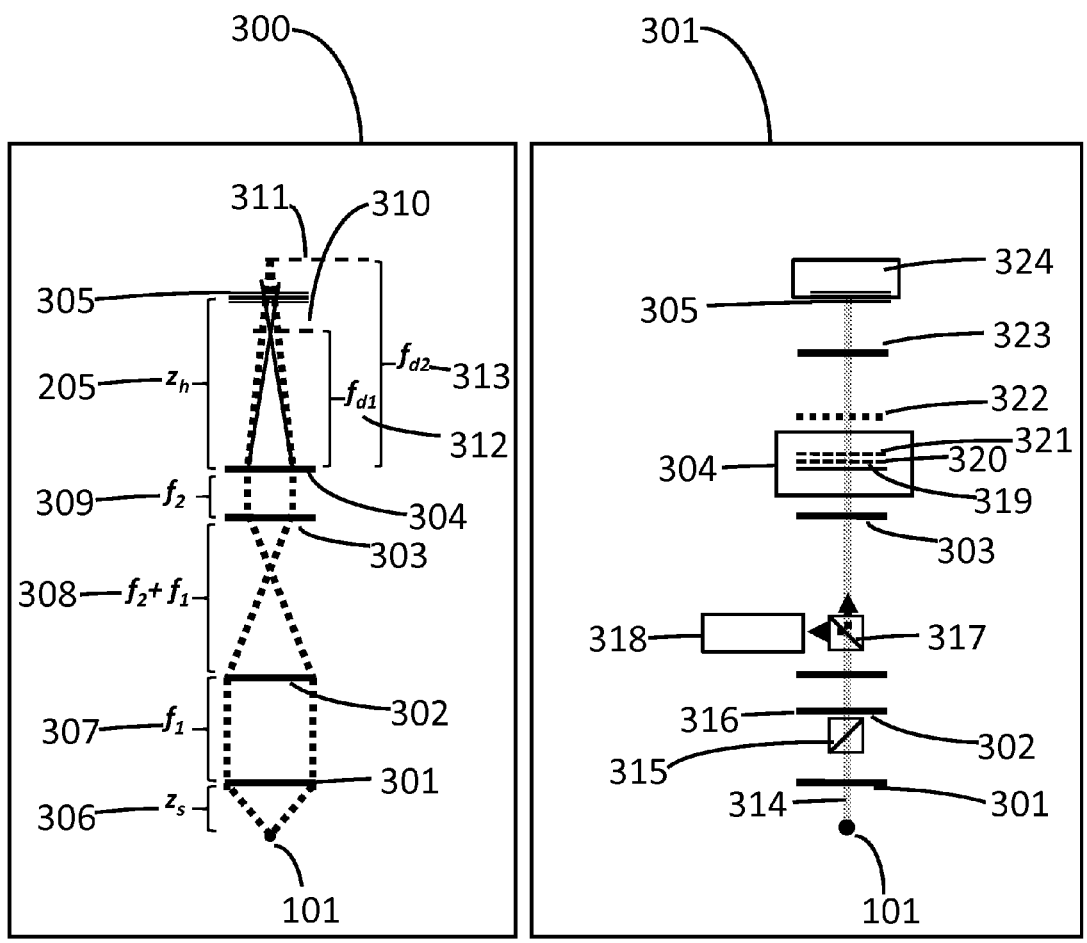
FIG. 3. Schematic of a FINCH fluorescence microscope using Thin Liquid Crystal Gradient Refractive Index (TL-CGRIN) lens.

FIG. 3 shows a detailed schematic of a more recent method, which has been to use a glass lens in conjunction with a liquid crystal Fresnel lens or Gradient Refractive Index (GRIN or TLCGRIN) lens in a totally transmissive arrangement, reported in Opt. Lett. 38, 5264-5267 (2013). On the left side of the FIG. 300 is depicted the detailed ray diagram for a FINCH hologram of a point. The light leaves the object 101, traveling a distance 306 to be collected by the objective lens 301. The collimated light leaving 301 propagates the distance 307 to the first of two relay lenses, 302. The light travels the distance 308 to the second relay lens 303 and then a further distance 309 to the GRIN assembly 304. The GRIN assembly 304 with two effective focal lengths 312 and 313 creates the two waves that propagate to the distances 310 and 311, while the hologram 305 is located at the plane removed from the GRIN assembly 304 by the hologram distance 205. On the right side of the FIG. 301 is depicted the detailed arrangement of the components in the referenced microscope system. All optics are centered on the optical propagation axis 314. The dichroic beamsplitter and emission filter 315 and 316 are necessary for fluorescence microscopy, while the polarizing beamsplitting cube 317 is used to polarize the received light at an angle of 45 degrees to the active axis of the GRIN assembly. The rejected polarization component form this polarizer is sent to the camera 318 that records a standard image. The GRIN assembly 304 contains a glass lens 319, and active GRIN 320 and an inactive GRIN 321. The glass lens focuses all the light passing through it, while the active GRIN adds additional focal length to the light that passes parallel to its axis, and the inactive GRIN serves to compensate for side effects of the light passing the active GRIN. Thus the two focal lengths 312 and 313 are created. Distances are corrected to account for the optical path through the glass of the BS cubes. The final two optics are the phase shifting waveplate 322 and the output polarizer 323, which modulate the overall phase of the hologram and increase interference efficiency, respectively. The hologram plane 305 is between the two focal lengths 312 and 313, and a camera 324 is used to record the hologram. FIG. 3 is adapted from Optics Letters 38, 5264-5267 (2013).

While the TLCGRIN method is an improvement over the SLM, it still is limited by the reduced imaging quality of a Fresnel lens or the limited number of graded regions used to create a liquid crystal GRIN lens. Furthermore it is challenging to make GRIN lenses with sufficient aperture and shortness of focal length for high quality imaging and compactness of a holographic system. In this GRIN lens system example, the GRIN lens had a 5000 mm focal length and the glass lens a 300 mm focal length. Furthermore both the SLM and GRIN lens systems require electrical control of the devices in addition to compensating lenses to control for dispersion in the liquid crystal material. This combination of focal lengths creates a spacing factor between the two focal lengths of less than 3%, which reduces the axial depth of 3D objects that can be reliably imaged by the holographic system [Opt. Exp. 20, 9109 (2012)].

Figure 4:
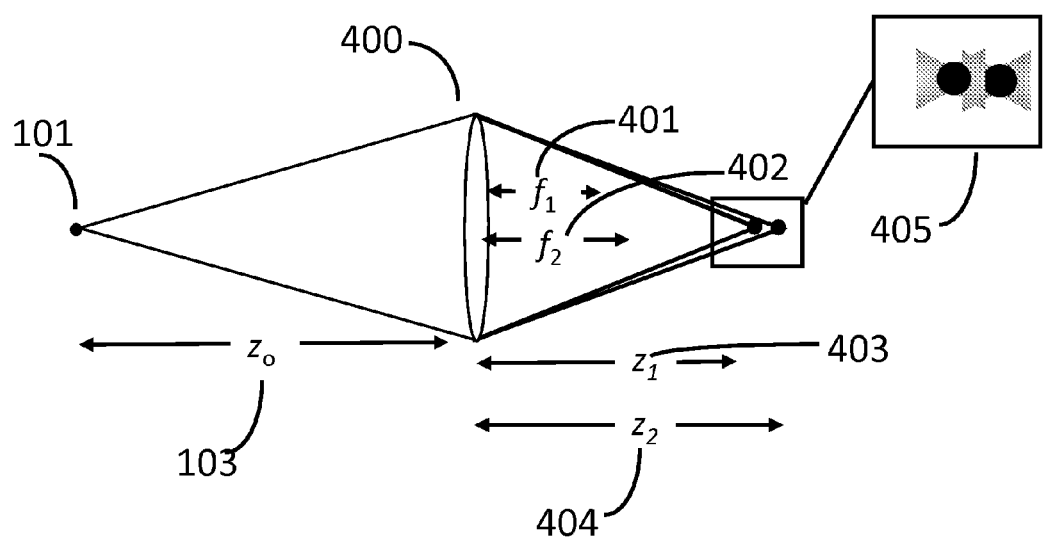
FIG. 4. A birefringent lens with two focal lengths $f_1$ and $f_2$.

To address this, the inventors have discovered a unique use for spherical lenses that can be constructed of birefringent materials. FIG. 4 shows an example of a lens 400 made from a birefringent material. Birefringent substances have two distinct polarization sensitive refractive indices and thus lenses made from such materials always have two focal lengths $f_1$ 401 and $f_2$ 402 and produce blurry images when randomly polarized light is passed through them, since a single sharp plane of focus is not possible unless the image is viewed through a polarizer. When randomly polarized light is passed through the lenses, a single sharp focus cannot be obtained since the multiple refractive indices of the material cause the lens to display a different focus for light of p or s polarization, creating two images at distances 403 and 404. Thus these lenses yield a doubled or blurry image 405, which is generally undesirable in standard optical applications. For this reason birefringent materials are not typically used to make optical lenses because of this ordinarily undesirable property; evidence of this is that birefringent lenses are not readily commercially available from optical supply houses. Currently birefringent lenses must be custom made and there are few reports in the literature of their construction [Proc. of SPIE Vol. 6018, 601812 (2005); Meas. Sci. Technol., 17, 1367 (2006); Optik 118, 335-339 (2007)]. However since birefringent materials such as calcite, barium borate, lithium niobate and quartz can be readily worked just like glass, it is possible to readily prepare lenses of birefringent materials to any lens specification, given a rationale for making them.

The inventors have discovered that the simultaneous usage of the multiple focal lengths of birefringent lenses can be very advantageous to create very high quality holograms that can reveal the three dimensional information of objects. The current invention can be applied to many forms of holography including FINCH and operates in an electrically independent manner with optical characteristics that yield unmatched holographic image quality which exceeds the performance of standard imaging methods. Furthermore, in addition to holographic imaging applications, the current invention also enhances and simplifies other forms and uses of holography and interferometry. For an example, birefringent lenses were already found in nature long ago in the eye of the trilobrite, a creature that lived in the sea 450 million years ago. These eye lenses were called schizochroal and made of birefringent calcite. One might speculate that lenses made of calcite became extinct during evolution because of their undesirable optical properties. Calcite is an optically clear material with two different refractive indices depending upon the plane of polarization. Even though it is not a good material to make standard lenses, its polarizing properties are widely exploited to make polarizers and polarization sensitive devices such as Glan-Taylor prisms. Calcite is used because it is optically clear and its crystal structure can efficiently pass a single axis of linear polarization. However if lenses are made of calcite, because of the different refractive indices at the two planes of polarization, two distinct polarization sensitive focal lengths of those lenses are observed (see https://community.dur.ac.uk/g.d.love/downloadable/china05.pdf). However with mixed polarization light, which is the common form of light in the environment, a blurred image would result if lenses were made of birefringent materials. While the trilobrite used calcite for its lens material, one might wonder if its vision was blurred or if it could see the two focal planes because its photoreceptors were cross polarized.

However, an imaging method that required different aligned copies of the same image could benefit greatly from just such a birefringent lens. Incoherent holography, a class of holography that includes FINCH and other methods [Opt. Lett. 32, 912 (2007); Nat. Photonics 2, 190 (2008); Opt. Express 19, 5047 (2011); Opt. Express 19, 26249 (2011); Opt. Express 20, 19822 (2012); Opt. Lett. 38, 3922 (2013); Opt. Lett. 38, 5264-5267 (2013), and U.S. Pat. Nos. 8,009,340, 8,179,578 and 8,542,421], is a technique for creating holograms from the interference of two copies of the same image, or from any singe EM radiation wave that is split into two copies, and has been demonstrated using polarization-sensitive optical elements (PSOEs) such as SLMs and liquid crystal Fresnel and GRIN lenses. These PSOEs, which are not classical refractive spherical lenses but which may be diffractive or refractive in operation, serve to split the image beam into two parts with differing spherical curvatures. In the further description of the process, we consider light emanating (by emission or reflection or any other process) from a single infinitesimally small object point, which creates a "point hologram" that suffices to describe the system; extended objects larger than this create holograms that are simply the sums of the holograms of all the differing points constituting the extended object. It is common to use a broad, collimated laser beam as a model source of EM radiation in these systems, since the image of such a beam is a diffraction-limited spot as from an infinitesimal point source. This aspect enables the empirical characterization of the best response of any such system.

Figure 5:
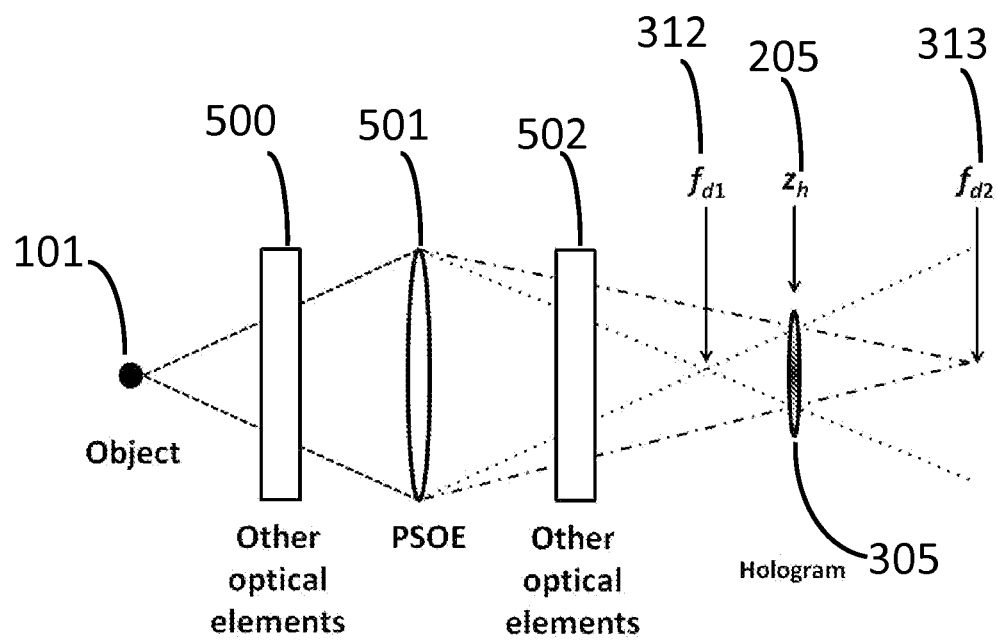
FIG. 5. Generalized scheme for creating a FINCH hologram.

FIG. 5 shows a schematic of the FINCH process highlighting the role of the PSOE. The PSOE 501 has two different focal lengths, of which $f_{d1}$ is the shorter and $f_{d2}$ is the longer. Other optical elements or groups 500, 502 may be used to make specific alterations in the overall phase, polarization, aberration correction or magnification or hologram size of the system, but the beam separation is solely a result of the use of the PSOE. After emanating from the object and possibly passing other optical elements, the light wave is split into two waves, of differing focal lengths by the PSOE. These waves propagate through the same space in the same direction, and are termed the signal and reference or $f_{d1}$ and $f_{d2}$ waves. Currently this is accomplished in one of two ways:

1. By polarization: the received wave hitting the PSOE is polarized at 45 degrees to the polarization axis of the PSOE. Thus half of the wave with polarization component projected parallel to the PSOE polarization axis is given the curvature encoded in the PSOE, while the half of the wave with polarization component projected perpendicular to the PSOE polarization axis maintains its original curvature. The result is the $f_{d1}$ and $f_{d2}$ waves.

2. By sampling of the PSOE: The PSOE is divided into more than one portion, each of which is encoded with differing spherical phases. The portions may be interspersed with each other and not contiguous. The received wave hitting the PSOE is polarized entirely parallel to the PSOE polarization axis, and the wave emerging from the PSOE has different portions with differing curvatures added corresponding to the curvatures encoded in the different portions of the PSOE. If the PSOE has two portions, the two wave portions emerging from the PSOE are termed $f_{d1}$ and $f_{d2}$. However the PSOE can have more than two portions, in which case there are light waves termed $f_{d3}$, etc.

Current technologies serving as polarization-sensitive PSOEs to generate the $f_{d1}$ and $f_{d2}$ waves include digital spatial light modulators (SLMs), liquid crystal (LC) Fresnel lenses and LC gradient refractive index (GRIN) lenses. In some configurations these components are also used in conjunction with classical lenses, or more than one of the components may be used in conjunction with each other.

After propagating from the PSOEs, the two waves interfere and create the hologram recorded at the detector $(z_h)$ plane. The detector may be a CCD, CMOS or other camera or image capture device as well as a point detector or solid-state device such as an avalanche photodiode. Optionally the waves may pass through a variable phase shifter and a polarizer. To reconstruct a point or image and provide the basis to remove bias and the twin image in holography, the detector captures two or more raw holograms, in which the phase of one of the beams is set to differ by a predetermined amount in subsequent raw holograms, to allow for the recovery of the complex hologram that fully captures the phase characteristics of the original EM source [Optics Letters 22(16), 1269-1270 (1997)]. The collection of raw holograms with such different phase factors is critical to achieving the optimal result with FINCH and similar holography methods.

One of the key parameters in this process is the relationship between the focal lengths $f_{d1}$ and $f_{d2}$ and the hologram recording plane at $z_h$. Holograms may be recorded at any point after the PSOE, but the optimal hologram quality is made possible when the two waves obey a condition of maximal spatial overlap. The condition to ensure maximum overlap between the $f_{d1}$ and $f_{d2}$ beams is met when the hologram is recorded at the plane $$z_h = 2\frac{f_{d1}f_{d2}}{(f_{d1}+f_{d2})}. \tag{1}$$

This relationship may also be expressed as $$z_h = (1+s) \times f_{d1} = (1-s) \times f_{d2}, \tag{2}$$

where the spacing factor s obeys the equality:

$$s = \left|\frac{f_{d2}-f_{d1}}{f_{d2}+f_{d1}}\right|. \tag{3}$$

As s increases (the distance between $f_{d1}$ and $f_{d2}$ increases), the point hologram at the optimal $z_h$ plane also increases in size, as described by the following equation:

$$R_H = s \times R_0, \tag{4}$$

where $R_H$ is the aperture radius of the hologram and $R_0$ is the aperture radius of the wave at the PSOE or equivalent. This size increase renders the point hologram more easily resolvable by recording devices but decreases the peak intensity of the hologram. There are other factors [Opt. Express 20, 9109 (2012)] that also establish upper and lower bounds for s. It is very desirable to have complete control over s over a wide range in order to be able to optimize the holographic system for all possible variables. The s factor does not itself change the resolution of the image coded by the hologram, but does affect the ease with which the hologram may be recorded; and further, any arrangement used to change s will affect other image factors such as magnification and depth of field.

Each of the three current technologies mentioned above can serve to create $f_{d1}$ and $f_{d2}$, but each also bears significant disadvantages:

1. SLMs are easily adjustable to produce different focal length PSOEs at will, in the form of digitized Fresnel phase patterns, but suffer from low focusing efficiency to the desired image, as diffraction from the pixilated digital SLM causes significant light loss into transverse foci of higher diffraction orders. Additionally, the PSOEs created on SLMs suffer from significant variability in focal length as a function of light wavelength (an effect termed chromatic aberration) which may degrade performance in hologram formation.
2. LC Fresnel lenses are polarization sensitive and do not suffer from higher-order transverse foci, but may display other axial foci and certainly suffer from significant chromatic aberration. They are also not adjustable, and offer only a single nominal focal length.
3. LC GRIN lenses have focal lengths adjustable as a function of applied voltage, and less chromatic aberration than SLMs or LC Fresnel lenses, but have very long focal lengths that require them to be paired with regular refractive lenses in order to achieve reasonable overall focal lengths. Even when combined with refractive lenses, LC GRIN lenses offer limited possibilities for spacing factor. Finally, currently used LC GRIN lenses are quantized approximations of lenses (because of the practical limitation of the number of differentially refractive zones possible) and thus impose spatial distributions of light in the unfocused beams that can cause reduced interference efficiency and accuracy of focal length calculation.

Figure 6:
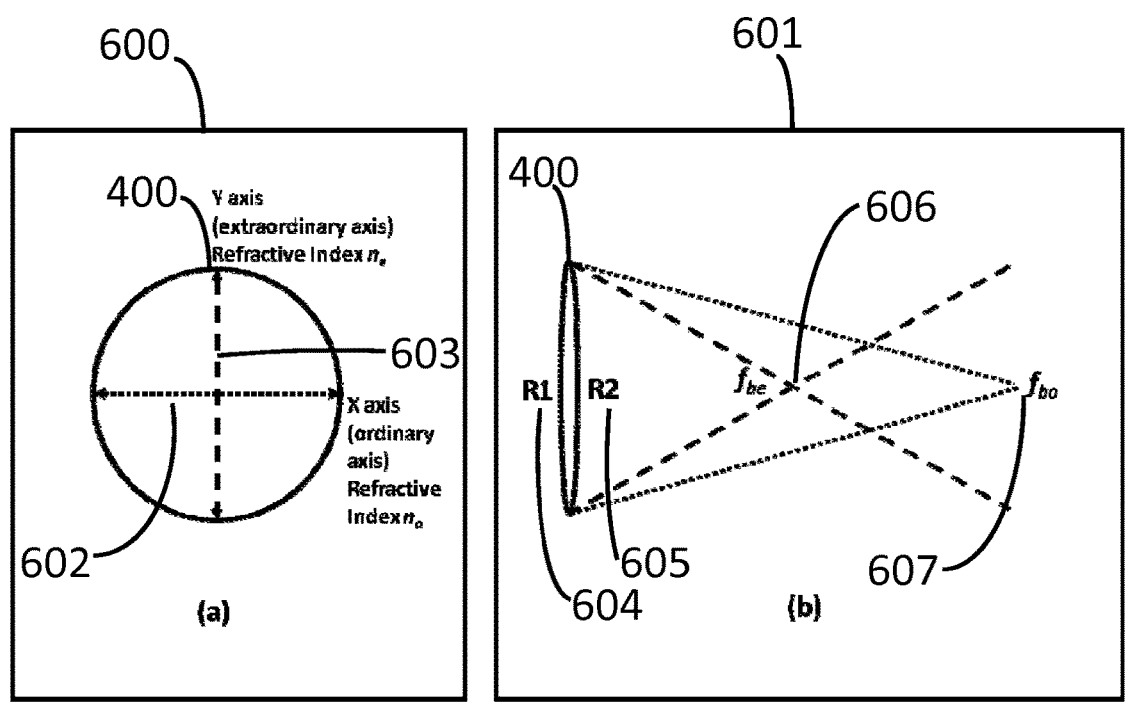
FIG. 6: The differing focal lengths of a birefringent lens resulting from the differing refractive indices in the transverse plane of the lens.

There is a pressing need in this field for the introduction of a device to create the $f_{d1}$ and $f_{d2}$ beams without the disadvantages mentioned above, and with increased flexibility in the spacing factor s. Birefringent materials possess two or more refractive indices along different propagation directions in the material, termed the ordinary and extraordinary axes. These axes have refractive indices denoted $n_o$ and $n_e$, respectively. Since the focal length of a lens is dependent in part on the refractive index of the material comprising the lens, these materials could be used to create spherical lenses that possess two different polarization-dependent focal lengths, each of which produces a spherical beam and a focal spot of equal quality to those of a standard glass lens. FIG. 6 shows a schematic of a birefringent lens (BRL) focusing light of differing polarization to different focal planes. FIG. 6a 600 shows a cross-section of a BRL, with the ordinary 602 and extraordinary 603 refractive indices projected along the x and y Cartesian axes of the lens. FIG. 6b 601 shows the focal lengths $f_{be}$ 606 and $f_{bo}$ 607 of the single birefringent lens (with radii of curvature $R_1$ 604 and $R_2$ 705 for the two surfaces of the lens) for light polarized parallel to the extraordinary axis and for light polarized parallel to the ordinary axis of the lens, respectively. The quality of the beams and the focal spots of the BRL is much improved over those from diffractive PSOEs mentioned above. Birefringent Refractive Lenses offer advantages over PSOEs in several aspects of incoherent hologram generation, including:

1. Elimination of the noise and image artifacts due to unwanted diffraction orders of PSOEs or the quantization error inherent in digital or binary representations of lenses.
2. The possibility of correction of chromatic, spherical and other aberrations by use of corrective optics including non-birefringent and birefringent optics.
3. Precise and flexible tailoring of the spacing factor s by choice of BRL material, curvature and associated optics.
4. Simplification of and size reduction of the optical assembly by removal of electronic and reflective components.

This invention covers, in part, the use of a birefringent refractive lens (BRL), alone or in conjunction with other refractive lenses or other optical elements, to effect the splitting of the received wave into two orthogonally polarized waves with differing spherical curvature to create holograms. Birefringent crystals have differing refractive indices along their ordinary and extraordinary crystal axes, and by cutting a lens from such a material in the proper orientation with these two axes perpendicular to each other and both lying in the plane of the lens orthogonal to the direction of light propagation through the lens, a refractive lens with special properties may be created. These special properties are that the lens focuses light polarized parallel to one of its polarization axes (for example, the ordinary axis, also identified here as the x axis in a Cartesian system) to a given focal plane, while the light polarized parallel to the other axis (the extraordinary or y-axis) is focused to a different focal plane (see FIG. 6). This may be easily understood by referring to the thin lens equation:

$$\frac{1}{f} = (n-1)\left(\frac{1}{R_1} - \frac{1}{R_2}\right), \tag{5a}$$

or $$f = \frac{1}{(n-1)}\left(\frac{R_1 R_2}{R_2 - R_1}\right) = \frac{R_{\mathit{eff}}}{(n-1)},$$

$$\frac{1}{f} = (n-1)\left(\frac{1}{R}\right), \tag{5b}$$

or $$f = \frac{R}{(n-1)} = \frac{R_{\mathit{eff}}}{(n-1)},$$

$$R_{\mathit{eff}} = \begin{cases} \frac{R_1 R_2}{R_2 - R_1}, & \text{for a lens with two curved sides} \\ R, & \text{for a lens with one curved side} \end{cases} \tag{5c}$$

with f being the focal length of the lens, n the refractive index of the lens material, $R_1$ and $R_2$ the radii of curvature of the two sides of the lens, and $R_{\mathit{eff}}$ is the "effective" total curvature of the lens. Equation 5b is for the specific case of a lens with one flat side (plano-concave or plano-convex) and one curved side with curvature R. As called out in equation 5c, $R_{\mathit{eff}}$ for a lens with two curved sides is exactly equivalent to R of a plano-concave or plano convex lens. Equivalently to using a solid birefringent crystal, a birefringent liquid crystal material may be used to create a BRL when aligned and placed between two substrates with curvatures $R_1$ and $R_2$. Thus a single BRL, made from birefringent material with $n_o$ and $n_e$ for the ordinary and extraordinary refractive indices, has focal length $f_{bo}$ for light polarized along its ordinary axis and focal length $f_{be}$ for light polarized along its extraordinary axis. By virtue of the extraordinary axis of the lens being orthogonal to the direction of light propagation, the extraordinary axis will not impart a transverse offset to the beam as can happen in other axis orientations. The two focal lengths of the BRL may be used as the two focal lengths necessary for the holographic process, i.e. $f_{be}$ and $f_{bo}$ may be substituted for $f_{d1}$ and $f_{d2}$ in equation 3. By reference to equation 3, then, any single lens made of a given type of birefringent material will have a constant spacing factor no matter the physical curvatures of the lens:

$$s = \left|\frac{f_{be} - f_{bo}}{f_{be} + f_{bo}}\right| = \left|\frac{n_o - n_e}{n_o + n_e - 2}\right|. \tag{6}$$

However, when used in conjunction with a non-birefringent lens, each of the focal lengths of the birefringent lens combines with the single focal length $f_r$ of the non-birefringent lens to result in two new combined focal lengths, one for each polarization axis of the birefringent lens. Under the thin-lens approximation and assuming no distance between the birefringent lens and the standard lens, the focal lengths $f_{be}'$ and $f_{bo}'$ of the combined system are now:

$$f_{be}' = \frac{f_{be} \times f_r}{f_{be} \times f_r}, \tag{7}$$

and $$f_{bo}' = \frac{f_{bo} \times f_r}{f_{bo} + f_r},$$

and the combined spacing factor s' of the hologram system can be increased and decreased from this constant value according to the following equation:

$$s' = \left|\frac{f_{be}' - f_{bo}'}{f_{be}' + f_{bo}'}\right| = \left|\frac{f_{be} - f_{bo}}{f_{be} + f_{bo} + \frac{2f_{be}f_{bo}}{f_r}}\right|. \tag{8}$$

Note the similarity of the right-most part of equation 8 to the internal part of equation 6, showing the additional factor for adjustment of the spacing factor. Table 1 contains the refractive indices, curvatures, focal lengths and inherent spacing factors of spherical lenses that could be made from several select birefringent material, calculated from equations 4-6, as well as corresponding altered focal lengths and altered spacing factors for systems incorporating these lenses and select glass lenses, calculated from equations 7 and 8. The collected data demonstrate the possibility to exercise total control of the spacing factor and other holography properties of BRL based systems.

TABLE 1

Refractive indices, curvatures, focal lengths and incoherent hologram parameters of selected birefringent materials.

| Birefring. material | $n_o$ | $n_e$ | $R_1$ (mm) | $R_2$ (mm) | $f_{bo}$ (mm) | $f_{be}$ (mm) | s | $z_h$ (mm) | $f_r$ (mm) | $f_{bo}'$ (mm) | $f_{be}'$ (mm) | s' | $z_h'$ (mm) |
|---|---|---|---|---|---|---|---|---|---|---|---|---|---|
| calcite | 1.66 | 1.49 | 95 | −95 | 72 | 98 | 0.150 | 83 | −166 | 128 | 237 | 0.300 | 166 |
| calcite | 1.66 | 1.49 | 190 | −190 | 144 | 195 | 0.150 | 166 | N/A | 144 | 195 | 0.150 | 166 |
| calcite | 1.66 | 1.49 | 380 | −380 | 289 | 391 | 0.150 | 332 | 332 | 154 | 179 | 0.075 | 166 |
| quartz | 1.54 | 1.55 | 95 | −95 | 87 | 86 | 0.008 | 87 | −173 | 176 | 170 | 0.016 | 173 |
| quartz | 1.54 | 1.55 | 190 | −190 | 175 | 172 | 0.008 | 173 | N/A | 175 | 172 | 0.008 | 173 |
| quartz | 1.54 | 1.55 | 380 | −380 | 349 | 344 | 0.008 | 346 | 346 | 174 | 172 | 0.004 | 173 |
| barium borate | 1.68 | 1.55 | 95 | −95 | 70 | 86 | 0.101 | 77 | −200 | 108 | 150 | 0.164 | 126 |
| barium borate | 1.68 | 1.55 | 190 | −190 | 140 | 172 | 0.101 | 154 | N/A | 140 | 172 | 0.101 | 154 |
| barium borate | 1.68 | 1.55 | 380 | −380 | 280 | 343 | 0.101 | 309 | 100 | 74 | 77 | 0.025 | 76 |

The first column refers to the birefringent material of the lens discussed in the row.
$n_o$ and $n_e$ are the ordinary and extraordinary refractive indices of the birefringent material.
$R_1$ and $R_2$ are the radii of curvature of the birefringent lens.
$f_{bo}$ and $f_{be}$ are the ordinary and extraordinary focal lengths of the birefringent lens, as discussed in the text.
s is the inherent spacing factor of the birefringent material, as discussed in the text.
$z_h$ is the optimal hologram distance for the given combination of birefringent material and lens curvature, as discussed in the text.
$f_r$ is the focal length of an optional non-birefringent lens used in conjunction with the birefringent lens for the purpose of altering the spacing factor and optimal hologram distance.
$f_{bo}'$ and $f_{be}'$ are the altered ordinary and extraordinary focal lengths of the birefringent lens, as discussed in the text.
s' is the altered inherent spacing factor of the birefringent material, as discussed in the text.
$z_h'$ is the altered optimal hologram distance for the given combination of birefringent material and glass lens, as discussed in the text.

Figure 7:
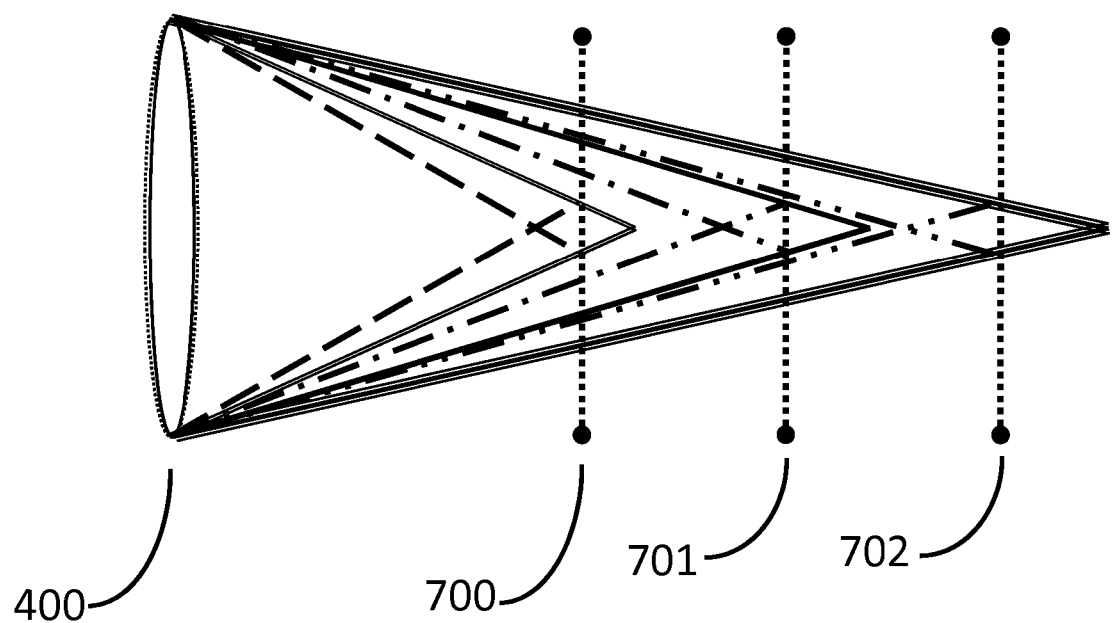
FIG. 7. Wavelength dependent shift in location of optimal hologram planes.

The implications of equation 8 include that:
1. The choices of $R_1$ and $R_2$ of the birefringent lens and focal length $f_r$ of the standard lens allow any spacing factor to be achieved with a BRL made from any birefringent material.
2. Use of a positive lens as the standard lens will reduce s' as compared to s, while use of a negative lens as the standard lens will increase s' as compared to s.
3. Hybrid lenses of any desired focal length, achromaticity and spacing factor can be made of materials that are composed of birefringent and non-birefringent material components cemented together.
4. While compound lens compositions of birefringent materials can make a device achromatic, it should be realized that the wavelength specific refraction of each lens in a non-achromatic birefringent lens will proportionally shift the focus of each of the lens focal points made from a birefringent material. Thus the plane of maximum interference will be shifted depending on wavelength. Because of this, a feature enabled by using birefringent lenses is that wavelength specific holograms can be obtained by hologram detection at any of those wavelength specific hologram planes even though the input is polychromatic. FIG. 7 shows an example of the shift in hologram planes 700, 701, 702 as a function of variance in wavelength. Dashed lines and double lines represent a blue wavelength 700, dashed single dot lines and solid lines represent a green wavelength 701, and dashed double dot lines and triple lines represent a red wavelength 702.

One skilled in the art will realize that the above equations 5, 7 and 8 may be adjusted for use with more accurate lens equations and to account for some distance between the BRL and the glass lens.

Thus birefringent refractive lenses can be used to significantly materially improve hologram creation when used in the following configurations:

1. As the sole lens or optical element involved in hologram formation.
2. In conjunction with another paired lens or optical element to alter the spacing factor of the $f_{d1}$ and $f_{d2}$ beams, where the other lens or optical element may consist of:
   a. A single lens or optical element.
   b. A compound lens or optical element.
   c. A sequence of lenses or optical elements.
3. In conjunction with another corrective lens or optical element designed to correct spherical, chromatic or other aberrations in the birefringent refractive lens, where the corrective lens or optical element may consist of:
   a. Single, compound or multiple standard non-birefringent corrective lenses or optical elements designed to correct the aberrations of one or the other focal lengths of the birefringent refractive lens.
   b. Single, compound or multiple standard non-birefringent corrective lenses or optical elements designed to correct the average aberration of the two focal lengths of the birefringent refractive lens.
   c. Single or multiple birefringent corrective lens or optical element designed to correct the aberrations of one or the other focal lengths of the birefringent refractive lens, in which the corrective birefringent lens may be made of a different birefringent material than the hologram-forming birefringent refractive lens.
   d. Single or multiple birefringent corrective lens or optical element designed to correct the average aberration of the two focal lengths of the birefringent refractive lens, in which the corrective birefringent lens may be made of a different birefringent material than the hologram-forming birefringent refractive lens.
   e. Single or multiple birefringent corrective lens or optical element designed to correct the aberrations of one or the other focal lengths of the birefringent refractive lens, used in conjunction with standard non-birefringent lenses or optical elements, in which the corrective birefringent lens may be made of a different birefringent material than the hologram-forming birefringent refractive lens.
   f. Single or multiple birefringent corrective lens or optical element designed to correct the average aberration of the two focal lengths of the birefringent refractive lens, used in conjunction with standard non-birefringent lenses or optical elements, in which the corrective birefringent lens may be made of a different birefringent material than the hologram-forming birefringent refractive lens.

Figure 8:
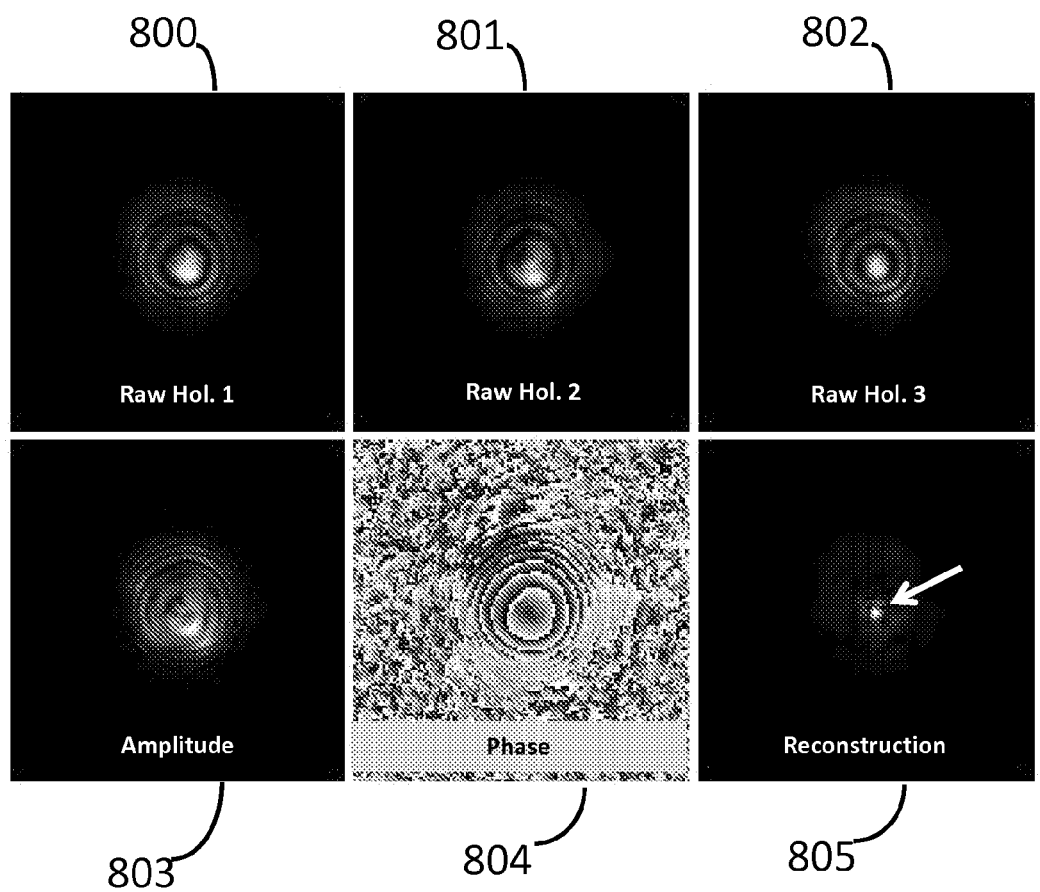
FIG. 8. Point hologram raw and processed images captured from a laser as the EM radiation source, using a FINCH system as in FIG. 3.
Figure 9:
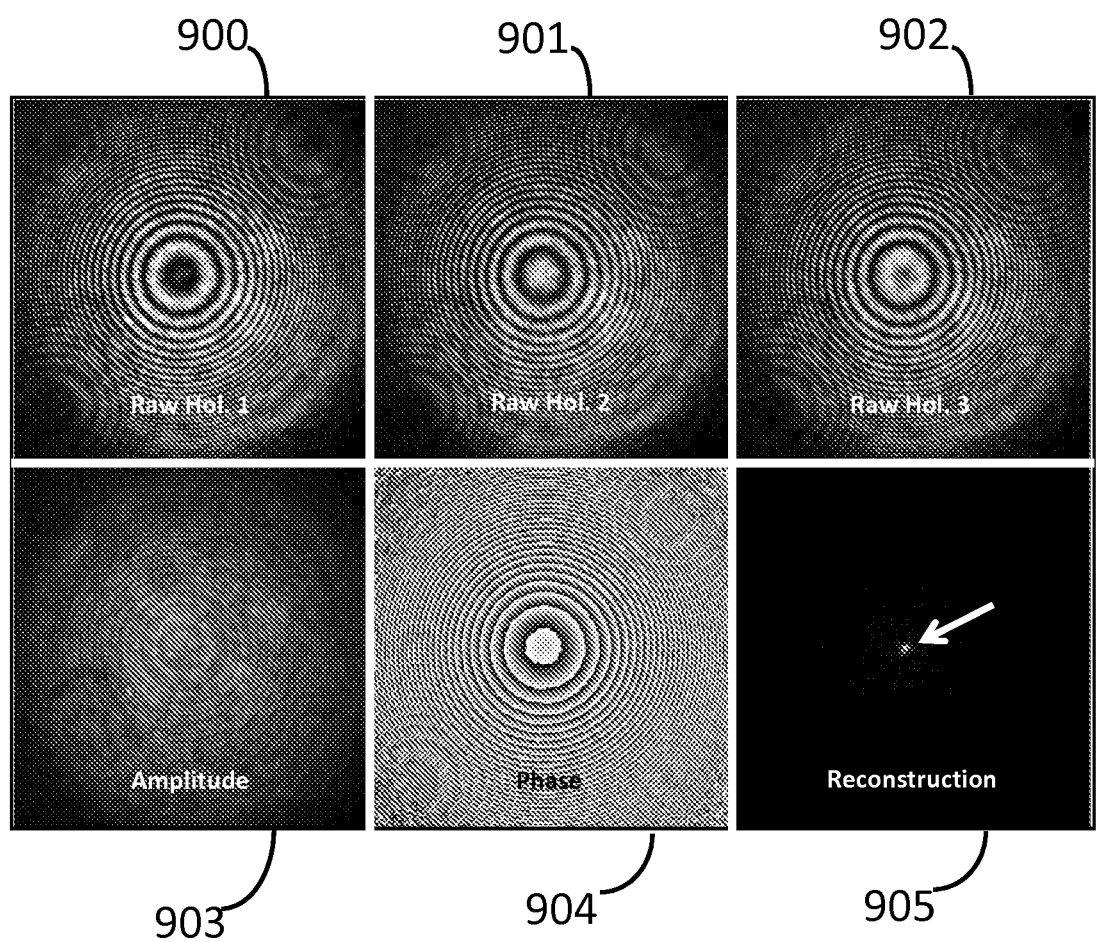
FIG. 9. Point hologram raw and processed images captured from a laser as the EM radiation source, using a FINCH system incorporating a calcite BRL.

Experimental work has confirmed the improvement seen in a FINCH system when a current TLCGRIN-based system was compared with a BRL-based system. FIG. 8 shows FINCH holograms obtained using a laser as the EM radiation source, from a FINCH system configured with liquid crystal GRIN lenses and a glass lens to create two focused beams with a hologram plane between them, as in the prior art shown in FIG. 3. The top three panels 800, 801, 802 in FIG. 8 show three phase-shifted raw FINCH holograms, which are significantly distorted from the well-modulated spherical Fresnel patterns that should characterize the ideal response of a FINCH system. The bottom three panels in FIG. 8 show, from right to left, the magnitude 803 of the complex FINCH hologram, the phase 804 of the complex FINCH hologram, and finally the reconstructed image 805 of the laser beam. The magnitude shows large intensity fluctuations and both the magnitude and phase show deviations from a perfect spherical shape. The reconstructed spot shows significant background signal as well as deviations from a perfect point shape. FIG. 9 shows the results from a similar system in which the only difference was the use of a spherical calcite BRL to induce the differing phase properties between the signal and reference beams instead of a GRIN lens plus glass lens arrangement; an imaging relay lens was also used to project the hologram onto the camera after it passed the BRL. All other factors and settings, including light source, ancillary optics, polarizers, phase shifting plate and voltage, and cameras were the same as those used to produce FIG. 8. In the top row of FIG. 9 are shown three phase shifted raw holograms 900, 901, 902 as in the top three panels of FIG. 8. The raw holograms are nearly perfect representations of the desired spherical Fresnel pattern, and show many more Fresnel rings than the raw holograms in FIG. 8, a result of the much greater spacing factors possible when using a calcite BRL instead of the GRIN/glass system. In the bottom three panels of FIG. 9, we again see, from right to left, the complex hologram magnitude 903 and phase 904 and the reconstructed image 905 of the laser. The magnitude and phase are both perfectly spherical patterns, with the magnitude free from the significant intensity fluctuations that affect the system described in FIG. 3 and used to produce FIG. 8. The phase shows a smooth slope and neat transitions at phase wrapping regions, and the reconstructed spot is point-like and free from excessive background levels. The dramatic improvement of FIG. 9 over FIG. 8 is indicative of the overall improvement in holographic imaging that BRLs can provide over other PSOEs.

Figure 10:
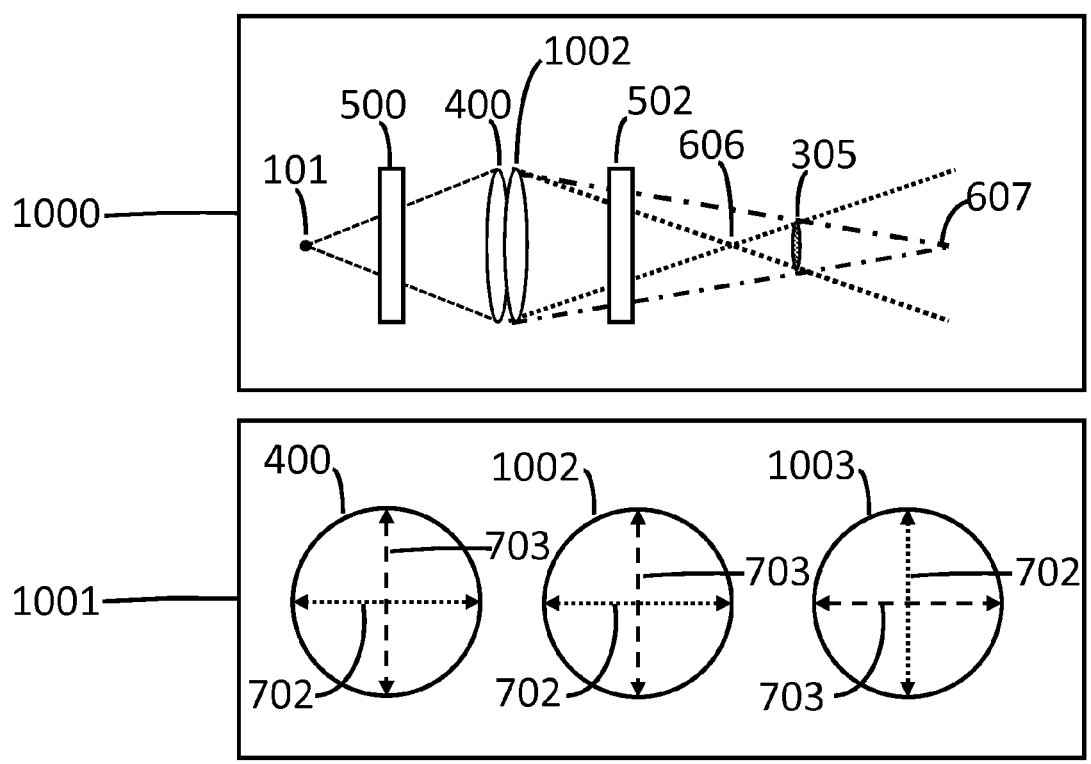
FIG. 10. Schematic of two birefringent lenses used in tandem.

Other systems may be constructed that make use of BRLs. As shown in FIG. 10, another system 1000 incorporates two BRLs 400 and 1002 used together, whether said BRLs are made from the same material or not, to achieve further modification of the two waves. The cross section diagrams 1001 of the two BRLs show how a second BRL 1002 could be used, with its axes 702 and 703 parallel or perpendicular to the corresponding axes of the first BRL 400, to provide chromatic, spherical or other corrections to the first BRL.

Figure 11:
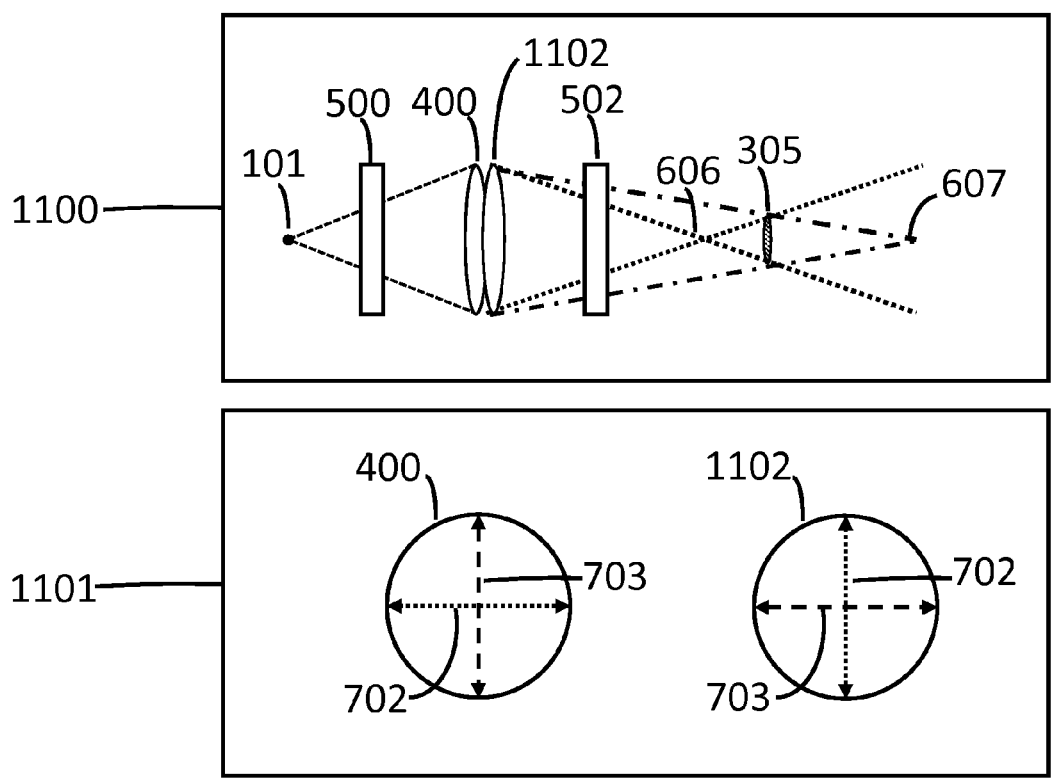
FIG. 11. Schematic of a birefringent lens used in conjunction with a flat birefringent plate.

FIG. 11 shows another system 1100 incorporating a BRL with two flat sides, hereinafter called a birefringent flat (BRF) 1102, acting to change the total optical path difference between the two waves in addition to the BRL that differentially changes the spherical curvature of the wavefronts of the waves. The cross sections 1101 show the relative orientations of the ordinary and extraordinary refractive indices 702 and 703 of the the BRL 400 and the BRF 1102. Optical path length (OPL) is a measure of the distance traveled by an EM wave, taking into account both the thicknesses of various media the waves traverse as well as their refractive indices:

$$OPL = \Sigma d_i n_i \qquad (9)$$

where $d_i$ and $n_i$ are the thicknesses and refractive indices of all media in the path traveled by the wave. The optical path difference (OPD) of two waves is a measure of the difference in the OPLs the waves traveled. When dealing with incoherent holography, it is important to keep the total optical path difference between the two waves low in order to maintain the conditions necessary for holography interference to occur. The BRL not only imparts different curvatures to the two waves through the two focal lengths $f_{be}$ 606 and $f_{bo}$ 607, but also imparts an overall optical path difference $OPD_o$ between the two waves that is proportional to the thickness $d_{BRL}$ of the BRL and the two refractive indices of the birefringent material:

$$OPD_o = d_{BRL}(n_o - n_e) \qquad (10)$$

By using a BRF of the same thickness and cutting angle as the BRL, but rotated by 90 degrees in the plane orthogonal to the direction of EM propagation, the $OPD_o$ may be corrected without changing the relative difference in the spherical curvatures of the two waves. The wave that projects along the ordinary axis in the BRL projects along the extraordinary axis of the BRF, and vice versa, so the non-spherical $OPD_o$ from the BRL is canceled by the BRF. Tilting the BRL slightly changes the magnitude of this OPD matching effect.

Figure 12:
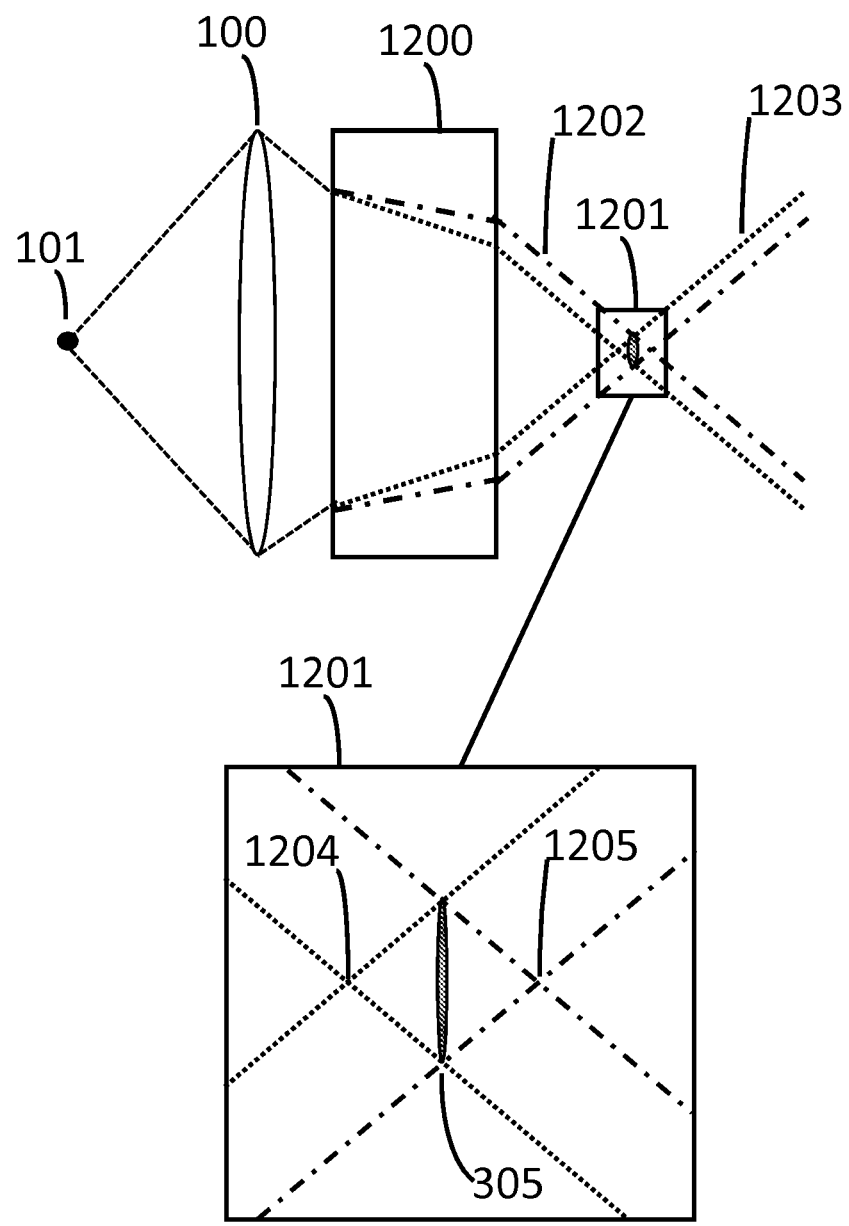
FIG. 12. Schematic of a birefringent plate or block used to create two focal planes from a single spherical glass lens.

Another system shown in FIG. 12 incorporates only a BRF 1200 along with a glass lens 100 to effect the separation of the received wave from the object 101 into two waves. Waves with positive spherical curvature entering a medium experience a delay in achieving their focal point. This delay Δ is proportional to the thickness t and refractive index n of the medium:

$$\Delta = t\left(1 - \frac{1}{n}\right) \qquad (11)$$

It can readily be seen in the magnified part 1201 of FIG. 12 that a BRF can delay the wave 1202 parallel to the ordinary axis and the wave 1203 parallel to the extraordinary axis by different amounts due to the differing refractive indices, which separates the focal planes 1204 and 1205 of the two waves and allows for holography interference 305 to take place.

Numerous modifications and variations of the present invention are possible in light of the above teachings. It is therefore to be understood that within the scope of the appended claims, the invention may be practiced otherwise than as specifically described herein.

The invention claimed is:

1. An optical apparatus, comprising:
a plurality of lenses including at least one lens incorporating anisotropic electromagnetic properties, and at least one compensating optical element incorporating anisotropic electromagnetic properties configured to correct optical path differences, wherein the plurality of lenses are configured to:
receive electromagnetic radiation from an object, wherein the electromagnetic radiation is incoherent light;
transform, by refraction using the at least one lens incorporating anisotropic electromagnetic properties without electrical control of the at least one lens, the received electromagnetic radiation to generate two or more differentially modulated electromagnetic waves propagating in a common path;
correct, using the at least one compensating optical element, one or more undesired optical path differences between the differentially modulated electromagnetic waves; and
provide for the differentially modulated electromagnetic waves, after the correcting, to create electromagnetic interference.

2. The optical apparatus according to claim 1, wherein the at least one lens incorporating anisotropic electromagnetic properties includes a birefringent lens.

3. The optical apparatus according to claim 2, wherein another lens is configured to modify the focal length of each of the differentially modulated electromagnetic waves exiting the birefringent lens.

4. The optical apparatus according to claim 3, wherein a spacing factor of the differentially modulated electromagnetic waves is changeable according to a focal length of said another lens.

5. The optical apparatus according to claim 4, wherein said another lens is a glass lens.

6. The optical apparatus according to claim 2, wherein the birefringent lens comprises alpha or beta barium borate materials.

7. The optical apparatus according to claim 2, wherein the birefringent lens comprises liquid crystal material encased in flat or positively or negatively curved birefringent materials.

8. The optical apparatus according to claim 2, wherein the birefringent lens comprises liquid crystal material encased in flat or positively or negatively curved non-birefringent materials.

9. The optical apparatus according to claim 1, wherein the electromagnetic interference forms a hologram representing the object.

10. The optical apparatus according to claim 9, wherein the hologram is a Fresnel Incoherent Correlation Holography (FINCH) hologram.

11. The optical apparatus according to claim 9, wherein the hologram is any of a Fresnel hologram, a Fourier hologram, a Fresnel Incoherent Correlation Holography (FINCH) hologram, or an off-axis hologram.

12. The optical apparatus according to claim 1, wherein the received electromagnetic radiation is from a microscope.

13. The optical apparatus according to claim 1, further comprising a camera configured to record the interference.

14. The optical apparatus according to claim 1, the apparatus being further configured to use the electromagnetic interference as an excitation pattern in scanning holography.

15. The optical apparatus according to claim 1, the apparatus being further configured to use the electromagnetic interference in an excitation source in a Structured Illumination (SIM) imaging system.

16. The optical apparatus according to claim 1, wherein the optical apparatus is contained within a microscope objective lens.

17. The optical apparatus according to claim 1, wherein the at least one compensating optical element is configured to minimize optical path differences between the differentially modulated electromagnetic waves relative to the coherence length of the electromagnetic radiation.

18. The optical apparatus according to claim 1, wherein the at least one compensating optical element is a birefringent compensating optic oriented with its anisotropic electromagnetic properties rotated relative to those of the at least one lens by a specific amount calibrated to achieve a desired level of correction.

19. A method comprising:
receiving electromagnetic radiation from an object, wherein the electromagnetic radiation is incoherent light;
transforming, by refraction using at least one lens incorporating anisotropic electromagnetic properties without electrical control of the at least one lens, the received electromagnetic radiation to generate two or more differentially modulated electromagnetic waves propagating in a common path;
correcting, using at least one compensating optical element incorporating anisotropic electromagnetic properties configured to correct optical path differences, one or more undesired optical path differences between the differentially modulated electromagnetic waves; and
providing for the differentially modulated electromagnetic waves, after the correcting, to create electromagnetic interference.

20. The method according to claim 19, wherein the at least one lens incorporating anisotropic electromagnetic properties includes a birefringent lens.

* * * * *

UNITED STATES PATENT AND TRADEMARK OFFICE
CERTIFICATE OF CORRECTION

| | |
|---|---|
| PATENT NO. | : 10,423,123 B2 |
| APPLICATION NO. | : 15/308208 |
| DATED | : September 24, 2019 |
| INVENTOR(S) | : Gary Brooker et al. |

It is certified that error appears in the above-identified patent and that said Letters Patent is hereby corrected as shown below:

In the Specification

On Column 1, Lines 16-21, replace with the following:
This invention was made with U.S. government support under grant R44CA192299 awarded by the National Institutes of Health. The U.S. government has certain rights in the invention.

Signed and Sealed this
Twenty-second Day of August, 2023

*Katherine Kelly Vidal*

Katherine Kelly Vidal
*Director of the United States Patent and Trademark Office*